US012662366B2

(12) United States Patent
Kunter et al.

(10) Patent No.: US 12,662,366 B2
(45) Date of Patent: Jun. 23, 2026

(54) MAIN VALVE INSERT FOR A TAP VALVE

(71) Applicant: ELAFLEX HIBY GmbH & Co. KG, Hamburg (DE)

(72) Inventors: Stefan Kunter, Hamburg (DE); Michael Wehner, Hamburg (DE); Torben Schörck, Hamburg (DE); Wolfgang Artmeier, Hamburg (DE)

(73) Assignee: ELAFLEX HIBY GmbH & Co. KG, Hamburg (DE)

( * ) Notice: Subject to any disclaimer, the term of this patent is extended or adjusted under 35 U.S.C. 154(b) by 98 days.

(21) Appl. No.: 18/861,929

(22) PCT Filed: May 3, 2023

(86) PCT No.: PCT/EP2023/061601

§ 371 (c)(1),
(2) Date: Oct. 31, 2024

(87) PCT Pub. No.: WO2023/217595

PCT Pub. Date: Nov. 16, 2023

(65) Prior Publication Data

US 2025/0289707 A1 Sep. 18, 2025

(30) Foreign Application Priority Data

May 10, 2022 (EP) .................................... 22172514

(51) Int. Cl.
*B67D 7/36* (2010.01)
*B67D 7/04* (2010.01)

(52) U.S. Cl.
CPC ................ *B67D 7/36* (2013.01); *B67D 7/04* (2013.01)

(58) Field of Classification Search
CPC ... B67D 7/36; B67D 7/04; B67D 7/06; B67D 7/42; B67D 7/52
(Continued)

(56) References Cited

U.S. PATENT DOCUMENTS

| | | | | |
|---|---|---|---|---|
| 5,327,949 | A | 7/1994 | Dotson et al. | |
| 10,669,149 | B2 * | 6/2020 | Gray | B67D 7/54 |

OTHER PUBLICATIONS

"Funktionsbeschreibung des Gasventils GV3 und Anderungen im Ersatzteilwesen", Leaflet Elaflex, XP-000949015A, Dec. 1, 1994, 2 pages.

(Continued)

*Primary Examiner* — David J Walczak
(74) *Attorney, Agent, or Firm* — Casimir Jones, S.C.; Brian F. Bradley

(57) ABSTRACT

A main valve insert (20) for a tap valve (10) for dispensing a fluid, having a channel (13) extending through the main valve insert (20), a valve seat (21) designed to cooperate with a main valve body (14) of the tap valve (10) to control a fluid flow through the channel (13), and an external thread (22) for connecting the main valve insert (20) to the tap valve (10). The external thread (22) comprises, viewed in cross-section, a plurality of thread elevations (23) having an outer flank portion (24) and an inner flank portion (25), wherein a flank angle of the thread elevations (23) in the outer flank portion (24) is in the range between 25° and 70° and in the inner flank portion (25) is less than 20°, wherein a thread pitch of the external thread is more than 2 times a width of the thread elevations (23) measured at the junction between the flank portions (24, 25).

20 Claims, 3 Drawing Sheets

Figure 1:
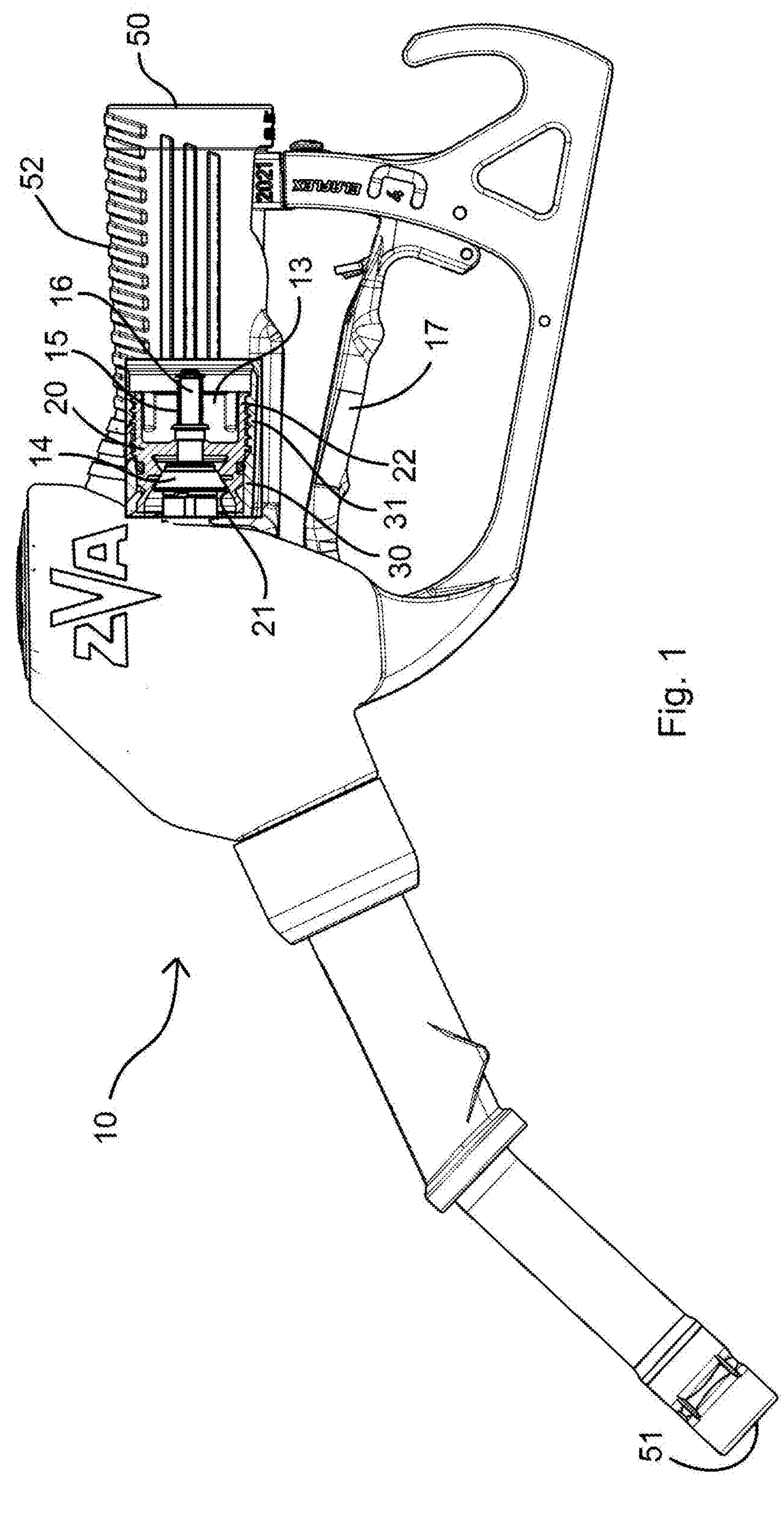

(58) Field of Classification Search
USPC ................................ 222/559, 556, 562, 563
See application file for complete search history.

(56) References Cited

OTHER PUBLICATIONS

International Search Report for PCT/EP2023/061601, mailed Aug. 21, 2023, 4 pages.

* cited by examiner

MAIN VALVE INSERT FOR A TAP VALVE

The subject of the present invention is a main valve insert for a tap valve for dispensing a fluid. A channel for the fluid extends through the main valve insert. The main valve insert also comprises a valve seat designed to cooperate with a main valve body of the tap valve to control a fluid flow through the channel. The main valve insert also comprises an external thread for connecting the main valve insert to the tap valve. A further subject of the invention is an arrangement comprising a main valve insert and a thread receiver for the main valve insert which can be fixed inside a tap valve housing, as well as a tap valve comprising such an arrangement.

The use of such main valve inserts is known in principle from the prior art. The main valve insert can be screwed by means of the external thread into an internal thread located inside the tap valve housing and in this manner securely fixed and positioned. A main valve body which is displaceably mounted inside the tap valve and pretensioned against the valve seat into a closed position can generally be actuated by means of a control lever in order to control a fluid flow through the tap valve. For cleaning and maintenance purposes, the threaded connection between the main valve seat and the internal thread can be released in order to remove the main valve insert and thus to permit simple access to the main valve insert or to further components present inside the tap valve. In the prior art, generally standard or pointed threads were previously used for the threaded connection, for example metric threads with a flank angle of 60°.

Proceeding from this prior art, it is the object of the present invention to provide a main valve insert for a tap valve for dispensing a fluid, which can be positioned in an accurate and simple manner inside the tap valve. This object is achieved by the features of the independent claims. Advantageous embodiments are specified in the dependent claims. According to the invention, the external thread comprises, viewed in cross section, a plurality of thread elevations having an outer flank portion and an inner flank portion, wherein a flank angle of the thread elevations in the outer flank portion is in the range between 25° and 70° and in the inner flank portion is less than 20°. Moreover, a thread pitch of the external thread is more than 2 times a width of the thread elevations measured at a junction between the flank portions.

Firstly, some of the terms used in the context of the invention are explained. In the context of the present disclosure, the term “fluid” can denote substances which are liquid, gaseous or even in mixed phases. The fluid can be, in particular, a fuel.

The cross section through the external thread under consideration runs through a central axis which is located centrally inside the external thread and which extends along the screwing-in direction of the external thread. The thread elevations are formed by a thread projection which extends on the outer circumference of the thread insert helically around the central axis. The outer flank portion is arranged further outwardly than the inner flank portion, relative to the central axis of the external thread. In the path from inside to outside, the flank angle changes at the junction between the flank portions. At the junction, a thread flank of the outer flank portion is thus at an angle to the thread flank of the inner flank portion.

A longitudinal direction of the valve seat, along which a main valve body can be moved in order to close the channel sealingly, can coincide with the central axis of the external thread.

In a preferred embodiment, the external thread is configured to be single-threaded. Accordingly, only a single-threaded design is referred to hereinafter. In the context of the invention, however, a double-threaded or multiple-threaded design of the external thread is also possible.

A thread elevation preferably has in each case two thread flanks which run in a linear manner in the outer and/or inner flank portion, when viewed in cross section. The flank angle in this case is constant inside the inner or outer flank portion. The thread elevations can be rounded or flattened on an external tip of the thread elevations. The case in which the thread flanks have a concave curvature or notches is also encompassed. In this case, the flank angle can be determined between imaginary outer contours (envelopes) of the thread flanks which run in a linear manner.

The thread pitch denotes the spacing between adjacent thread elevations of the external thread.

The shape of the thread elevations according to the invention with different flank angles in the region of the outer and inner flank portions, and with a large thread pitch in comparison with the width of the thread elevations, leads to a plurality of advantageous properties of a threaded connection which can be implemented by the external thread. In particular, it has been shown that the outer flank portions, which stand at an angle of between 25° and 70° to one another in the manner of a pointed thread, permit a secure hold with a high degree of self-locking after the production of a threaded connection. At the same time, the thread flanks which are arranged in the inner flank portion and which are more steeply inclined relative to the screwing-in direction, or can even be located (at a flank angle of) 0° perpendicularly to the screwing-in direction, are significantly better for transmitting force or movement during the screwing-in process in comparison with the thread flanks on the outer flank portion and thereby permit a more accurate positioning of the main valve insert along the central axis of the external thread.

Moreover, the large thread pitch in comparison with the width of the thread elevations simplifies the locating of the thread entry point during assembly, so that the external thread can be “threaded” significantly more easily into a suitable internal thread. In particular, due to the large spacing between two thread elevations a fitter can easily locate the start of the thread of the external thread, by positioning the external thread onto the internal thread in the axial direction and then rotating counter to the screwing-in direction until the start of the thread of the external thread exceeds a thread entry point of an internal thread. Shortly after exceeding the thread entry point, the external thread can be moved relative to the internal thread along a section in the direction of the internal thread which corresponds to the thread pitch. Since this is large in the present external thread, this movement can be easily perceived by the fitter. The risk of incorrect assembly and the damage or destruction of the start of the thread associated therewith is significantly reduced thereby.

The ability to locate the thread entry point in a simple manner can also be used in order to achieve, by a predetermined rotation, an accurately fixed thread engagement and an accurately predetermined axial position of the main valve insert. In particular, a stipulation can be made to the fitter that after locating the thread entry point a predetermined screwing-in angle has to be maintained or a predetermined number of rotations of the external thread has to be carried out relative to the internal thread for producing the threaded connection. An accurate adjustment of the axial position is important for the operation of the tap valve, since the force which the main valve insert exerts on adjacent parts (for example seals and/or spring elements) depends thereon.

In the prior art it was usual during assembly, however, to exert a predetermined torque by means of a torque wrench in order to achieve in this manner a desired axial position of the main valve insert and a desired thread strength. In the context of the invention, however, it has been recognized that the predetermination of a torque can lead to a faulty adjustment of the axial position due to component tolerances and surface conditions which can influence the friction between the thread partners. By being able to locate in a simple manner the thread entry point which permits an accurate thread engagement by the stipulation of a screwing-in angle, and by the thread flanks which are provided in the inner flank portion and which are oriented approximately perpendicular to the screwing-in direction, the axial position of the main valve insert according to the invention, and the forces exerted thereby on adjacent elements, can be adjusted in a significantly more accurate manner.

In one embodiment, the flank angle of the thread elevations in the outer flank portion is in the range between 40° and 70°, preferably between 55° and 65°. Moreover, the flank angle of the thread elevations in the inner flank portion can be less than 10° and preferably (approximately) 0°. A flank angle of 0° denotes the case in which the flanks run parallel to one another (i.e. perpendicular to the central axis). Moreover, the thread pitch can be more than 1.6 times, and preferably more than 2.5 times, the width of the thread elevations measured at the junction between the flank portions. Moreover, the thread pitch can be less than 6 times, and preferably less than 3.5 times, the width of the thread elevations measured at the junction between the flank portions. The positive properties of the threaded connection already described above are even more relevant due to the above specific case.

A spacing between adjacent thread elevations (thread pitch) can be between 2.5 mm and 3 mm, preferably between 2.6 and 2.9 mm, further preferably between 2.7 mm and 2.8 mm. Moreover, the width of the thread elevations measured at the junction between the flank portions can be in the range between 0.5 mm and 1.5 mm, preferably between 0.8 mm and 1.4 mm, further preferably between 0.9 and 1.3 mm. A height of the outer flank portion can be between 1.2 mm and 1.8 mm, preferably between 1.4 mm and 1.6 mm, wherein a height of the inner flank portion (25) can be between 0.8 mm and 1.4 mm, preferably between 1 mm and 1.2 mm. The width denotes the extent of the thread elevations along the central axis of the external thread, when viewed in cross section. The height of the respective flank portion denotes the extent of the flank portion in the radial direction (i.e. perpendicular to the central axis of the external thread) when viewed in cross section. An external diameter of the external thread can be in the range, for example, between 26 mm and 65 mm. In a preferred embodiment, the external diameter of the external thread is between 26 mm and 36 mm, preferably between 28 mm and 34 mm, further preferably between 30 mm and 32 mm. Alternatively, preferred regions of the external diameter can also be (in each case inclusively) between 37 mm and 47 mm, between 39 mm and 45 mm or between 41 mm and 43 mm. Alternatively, preferred regions of the external diameter can also be (in each case inclusively) between 49 mm and 59 mm, between 51 mm and 57 mm or between 53 mm and 55 mm. Preferred regions of the core diameter result from the preferred regions of the external diameter minus the height of the two flank portions already mentioned above.

In one embodiment, the external thread between the thread elevations has a bottom surface, the contour thereof running substantially parallel to a cylinder surface which is oriented concentrically to the central axis of the external thread. The bottom surface can extend in cross section over a partial region of the intermediate space between the thread elevations or over the entire intermediate space. The central axis forms in this case the center of the cylinder surface. In particular, the contour of the bottom surface can adopt a helical path along the cylinder surface. The orientation of the external thread can also be improved in the radial direction by the bottom surface. In particular, the internal thread can be guided in the radial direction along the bottom surface when producing the threaded connection.

A further subject of the invention is an arrangement comprising a main valve insert according to the invention and a thread receiver for the main valve insert which can be fixed inside a tap valve housing. The thread receiver has an internal thread which is engaged with the external thread, wherein the internal thread has thread recesses into which the thread flanks of the thread elevations located in the outer flank portion engage, forming a load-bearing threaded connection. Moreover, the internal thread has a guide projection which is located between the thread recesses and which extends over at least a part of the circumference of the internal thread and which bears in the axial direction against a thread flank of a thread elevation located in the inner flank portion. Since the guide projection bears against the thread flank which is steeply inclined relative to the central axis (or even located perpendicularly thereto), it fulfills a guide function so that the axial position of the main valve seat is accurately predetermined during the screwing-in process. It is possible that the guide projection additionally has a load-bearing function and thereby also contributes to the thread strength. The guide projection can also bear against the bottom surface of the external thread in the radial direction and in this manner permit a radial guidance by which the main valve insert is centered relative to the internal thread.

The guide projection can be positioned on a thread entry point of the internal thread. This has the advantage that already during the production of the threaded connection it leads to an accurate guidance of the main valve insert along the central axis of the external thread.

The main valve insert can have in the screwing-in direction guide surfaces which are positioned upstream of the external thread and which are designed such that they are guided slidably by the guide projection when the main valve insert is introduced into the thread receiver. In particular, the guide surfaces can have a maximum diameter which is adapted to the minimum internal diameter of the internal thread. The guide projection can extend over a circumferential portion of the internal thread of at least 90°, preferably at least 180°, further preferably at least 270°.

A further subject of the invention is a tap valve for dispensing a fluid, comprising a tap valve housing, an inlet, an outlet, a main channel for the fluid connecting the inlet to the outlet, a main valve body, a control lever for actuating the tap valve and an arrangement according to the invention. The arrangement according to the invention can be fixed, in particular, inside the tap valve housing such that the channel forms a part of the main channel of the tap valve. The advantages already described above in connection with the main valve insert result, in particular, in the main valve insert being able to be positioned accurately in the tap valve housing.

Figure 2:
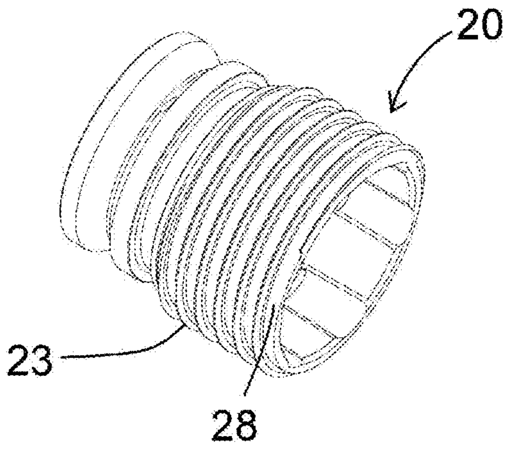
Figure 4:
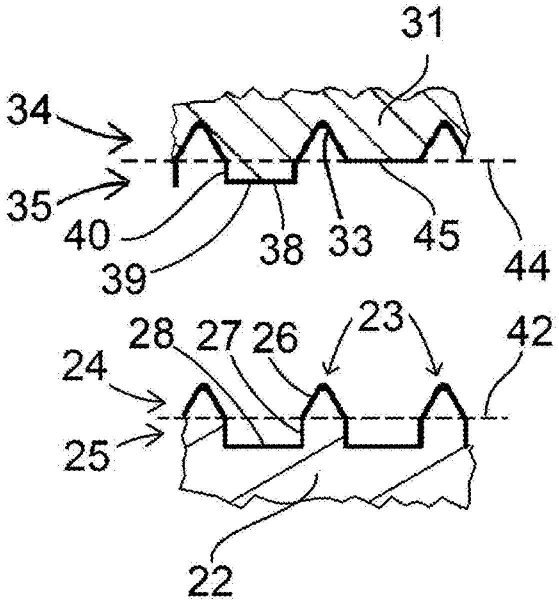
Figure 3:
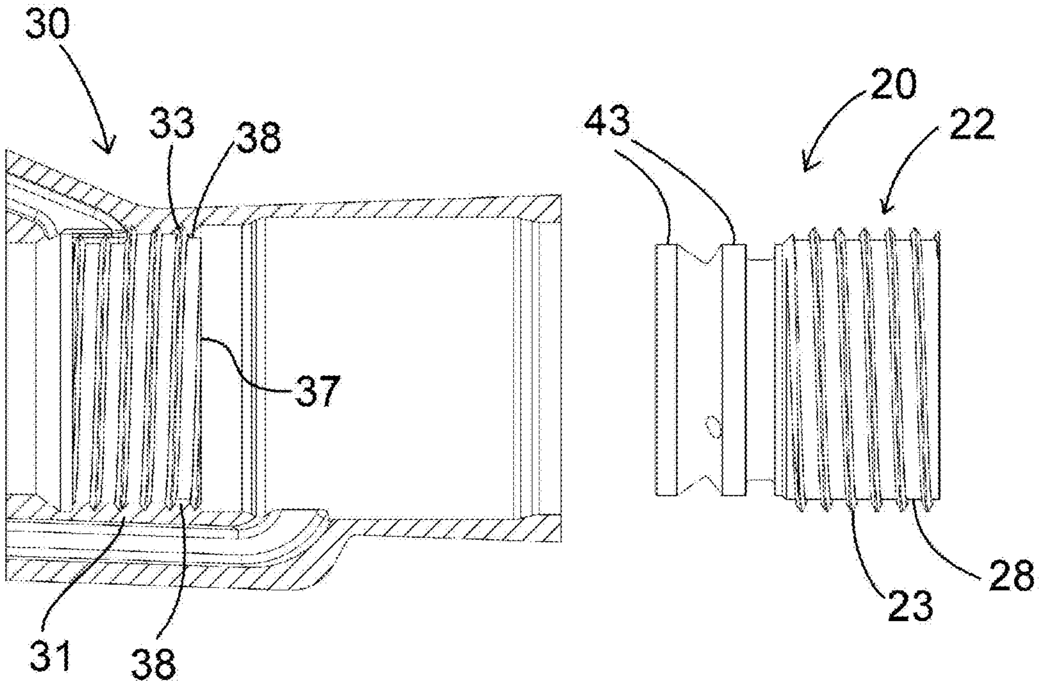
Figure 5:
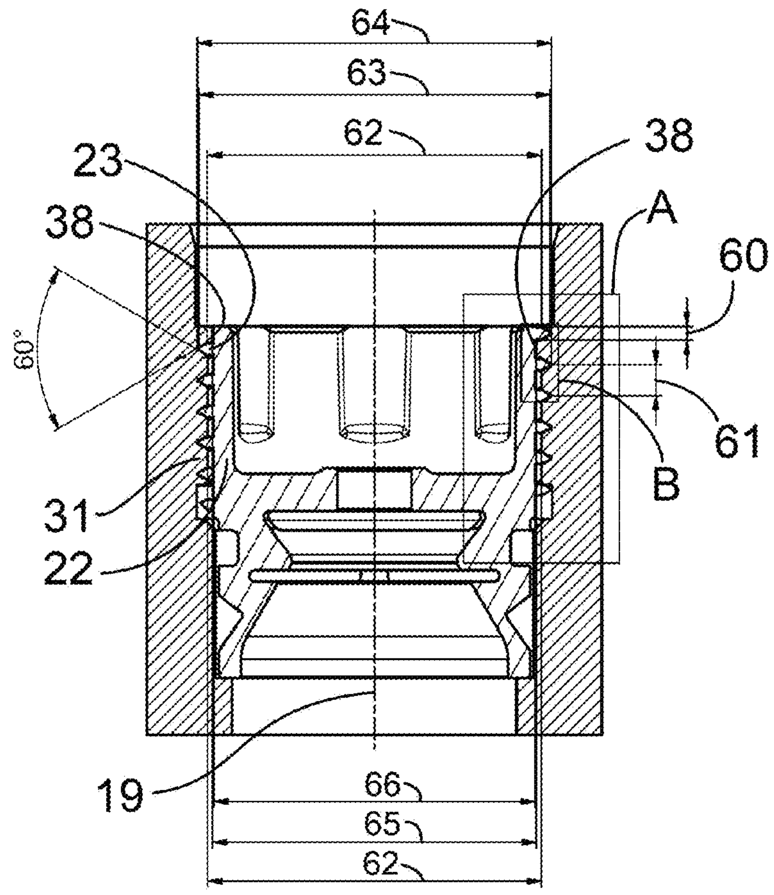
Figure 6:
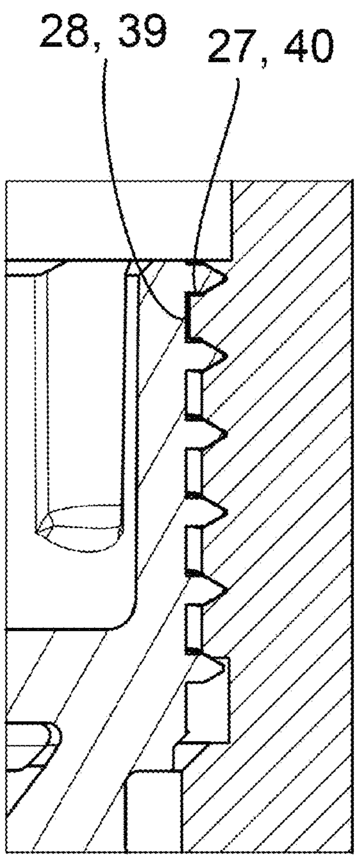
Figure 7:
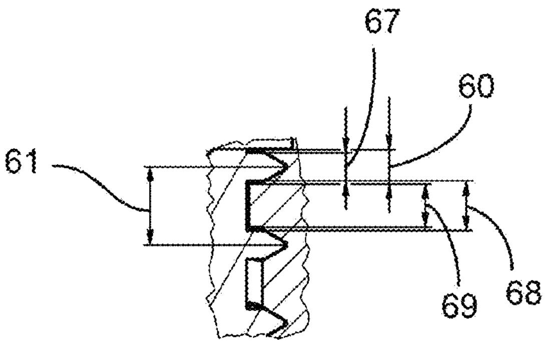

A preferred embodiment of the invention is explained by way of example hereinafter with reference to the accompanying drawings, in which:

FIG. 1: shows a tap valve according to the invention in a partially sectional side view;

FIG. 2: shows a main valve insert according to the invention in a three-dimensional view obliquely from above;

FIG. 3: shows the main valve insert according to the invention of FIG. 2 and a thread receiver before the production of a threaded connection in a partially sectional side view;

FIG. 4: shows a cross-sectional view of a partial region of an external thread (bottom) and an internal thread (top) of the arrangement of FIG. 3;

FIG. 5: shows the arrangement according to the invention of FIG. 3 in a lateral sectional view after the production of the threaded connection;

FIG. 6: shows a partial detail of FIG. 5 in an enlarged view;

FIG. 7: shows a partial detail of FIG. 5 in an enlarged view.

FIG. 1 shows a tap valve 10 according to the invention in a partially sectional side view. The tap valve comprises a housing 52, an inlet 50, an outlet 51 and a main channel which extends through the tap valve and which connects the inlet 50 to the outlet 51. A thread receiver 30 which is provided with an internal thread 31 is fixed inside the housing 52. The thread receiver 30 can be integrated in one piece in the housing 52 or can be configured as a separate component. Moreover, the tap valve has a main valve insert 20 with an external thread 22 which is screwed to the internal thread 31. The main valve insert 20 is positioned inside the housing 52 by the threaded connection between the internal thread 31 and the external thread 22 such that a channel 13 extending through the main valve insert 20 forms a part of the main channel.

The tap valve also has a main valve body 14 which in the state shown in FIG. 1 bears against a main valve seat 21 of the main valve insert 20. The main valve body 14 is connected to a valve piston 16 and is pretensioned by a pretensioning element 15 into a closed position against the valve seat 21. The tap valve can be actuated in the known manner by means of a control lever 17.

FIG. 2 shows a three-dimensional view of the main valve insert 20 according to the invention of FIG. 1. The external thread 22 of the main valve insert 20 has a thread projection extends which helically and concentrically to a central axis of the external thread 22 around the outer circumference of the main valve insert 20. When viewed in cross section (see bottom part of FIG. 4) a plurality of thread elevations 23 from the thread projection are visible. A bottom surface 28 which is oriented substantially parallel to the central axis and also extends helically around this central axis is located between the thread elevations 23.

FIG. 3 shows the main valve insert 20 according to the invention of FIG. 2 and a thread receiver 30 before the production of a threaded connection, in a partially sectional side view. In this view, it can be identified that the internal thread 31 has thread recesses 33 into which the thread elevations 23 of the main valve insert 20 engage during the production of the threaded connection. Moreover, the internal thread 31 has a guide projection 38 which extends over a circumferential angle of 360° in the region of the thread entry point 37. The guide projection 38 is designed, when the main valve insert 20 is introduced, to cooperate with guide surfaces 43 which are arranged at the front end of the main valve insert 20 in the screwing-in direction upstream of the external thread 22. The main valve insert 20 is centered relative to the thread receiver 30 by the cooperation of the guide surfaces 43 and guide projection 38. The design of the external thread 22 and the internal thread 31 is explained in more detail hereinafter by way of FIGS. 4 to 7.

FIG. 4 shows a cross-sectional view of two partial regions of FIG. 3, in which the external thread of the thread insert 20 (lower part of FIG. 4) and the internal thread of the thread receiver 30 (upper part of FIG. 4) can be seen. The cross section is oriented along the central axis of the respective thread. In this view it can be identified that the thread elevations 23 have an outer flank portion 24 and an inner flank portion 25. A junction between the flank portions 24, 25 is indicated in FIG. 4 by a dashed line 42. In the outer flank portion 24 the thread elevations 23 are formed in each case by two thread flanks 26 which are oriented at a flank angle of 60° to one another. In the inner flank portion 25 a thread elevation 23 has two thread flanks 27 which are oriented parallel to one another (i.e. located at an angle of 0° to one another). The thread flanks 27 are thus oriented perpendicularly to the central axis of the external thread 22. The bottom surface 28 already mentioned above is located between two thread elevations 23.

In the upper part of FIG. 4 it can be identified that the internal thread 31 also has an inner flank portion 35 and an outer flank portion 34. A junction between the flank portions 34, 35 is also indicated here by a dashed line 44. The thread recesses 33 are located in the outer flank portion 34. The thread recesses 33 are designed such that the thread flanks 26 of the external thread 22 engage in the thread recesses 33 when the main valve insert is screwed in, forming a load-bearing threaded connection. Due to the flank angle of the thread elevations 23 and the thread pitch, in this manner a high degree of thread strength can be achieved with effective self-locking.

The guide projection 38 already mentioned above is located between the left-hand thread recess 33 shown in FIG. 4 and the central thread recess 33. The guide projection 38 extends in the radial direction beyond the junction line 44 and has a radial guide edge 39 and axial guide edges 40. When producing the threaded connection, the axial guide edges 40 bear against corresponding thread flanks 27 in the inner flank portion 25 of the external thread 22. As a result, the rotation of the main valve insert is converted into an axial displacement in an efficient and positionally accurate manner. Moreover, the main valve insert 20 is accurately centered relative to the internal thread 31 by the cooperation of the radial guide edge 39 with the bottom surface 28.

As already mentioned above, the guide projection 38 extends only over a part of the circumference of the internal thread 31. Accordingly in FIG. 4 no guide projection 38 is present between the central thread recess 33 and the right-hand thread recess 33 but rather a flat thread elevation 45 which does not extend in the radial direction beyond the line 44. In the context of the invention, it has been shown that a guide projection 38 extending merely over a partial portion of the circumference is already sufficient for the radial and axial positioning. In other embodiments, however, the guide projection 38 can also extend over a greater circumferential angle or over the entire internal thread.

FIG. 5 shows the arrangement according to the invention of FIG. 3 in a lateral sectional view after the production of the threaded connection between the external thread 22 and the internal thread 31. FIG. 6 shows the partial detail identified in FIG. 5 by the letter A in an enlarged view. FIG. 7 shows the detail identified in FIG. 5 by the letter B in an enlarged view. From the figures it can be seen that the guide projection 38, which is arranged on the thread entry point 39 of the internal thread 22, is located between two thread elevations 23, wherein the radial guide edge 39 bears against the bottom surface 28 and the axial guide edge 40 bears against a thread flank 27 in the inner flank portion 25. In this view, the central axis 19 of the external thread 22 and the internal thread 31 is also illustrated.

In FIG. 5 the flank angle of 60° of a thread elevation 23 is illustrated. Moreover, the following thread parameters are illustrated in FIGS. 5 and 7 by means of lines and arrows arranged thereon:

- 60: width of a thread recess 33 (in the region of the junction line 44)=1.2 mm;
- 61: thread pitch=2.75 mm;
- 62: internal diameter of internal thread in the region of the flat thread elevation 45 (corresponds to the spacing between two junction lines 42 or 44 illustrated in FIG. 4)=29.4 mm;
- 63: external diameter of the external thread 22=30.9 mm;
- 64: maximum internal diameter of the internal thread 31 =31 mm;
- 65: internal diameter of the internal thread in the region of the guide projection 38=28.5 mm;
- 66: external diameter of the external thread in the region of the bottom surface 28=28.3 mm;
- 67: width of a thread elevation 23=1 mm;
- 68: width of the guide surface 28=1.75 mm;
- 69: width of the guide projection 38=1.525 mm.

The invention claimed is:

1. A main valve insert (20) for a tap valve (10) for dispensing a fluid, having a channel (13) extending through the main valve insert (20), a valve seat (21) designed to cooperate with a main valve body (14) of the tap valve (10) to control a fluid flow through the channel (13), and an external thread (22) for connecting the main valve insert (20) to the tap valve (10), characterized in that the external thread (22) comprises, viewed in cross section, a plurality of thread elevations (23) having an outer flank portion (24) and an inner flank portion (25), wherein a flank angle of the thread elevations (23) in the outer flank portion (24) is in the range between 25° and 70° and in the inner flank portion (25) is less than 20°, wherein a thread pitch of the external thread is more than 2 times a width of the thread elevations (23) measured at the junction (42) between the flank portions (24, 25).

2. The main valve insert (20) as claimed in claim 1, wherein the flank angle of the thread elevations (23) in the outer flank portion (24) is in the range between 40° and 70°.

3. The main valve insert (20) as claimed in claim 2, wherein the flank angle of the thread elevations (23) in the outer flank portion (24) is in the range between 55° and 65°.

4. The main valve insert (20) as claimed in claim 1, wherein the flank angle of the thread elevations (23) in the inner flank portion (25) is less than 10°.

5. The main valve insert (20) as claimed in claim 4, wherein the flank angle of the thread elevations (23) in the inner flank portion (25) is 0°.

6. The main valve insert (20) as claimed in claim 1, wherein the thread pitch is more than 1.6 times and/or less than 6 times the width of the thread elevations (23) measured at the junction (42) between the flank portions (24, 25).

7. The main valve insert (20) as claimed in claim 1, wherein the thread pitch is between 2.5 mm and 3 mm.

8. The main valve insert (20) as claimed in claim 7, wherein the thread pitch is between 2.7 mm and 2.8 mm.

9. The main valve insert (20) as claimed in claim 1, wherein the width of the thread elevations (23) measured at the junction (42) between the flank portions (24, 25) is in the range between 0.5 mm and 1.5 mm.

10. The main valve insert (20) as claimed in claim 9, wherein the width of the thread elevations (23) measured at the junction (42) between the flank portions (24, 25) is in the range between 0.9 mm and 1.3 mm.

11. The main valve insert (20) as claimed in claim 1, wherein the external thread (22) between the thread elevations (23) has a bottom surface (28), the contour thereof being oriented substantially parallel to a cylinder surface which is oriented concentrically to a central axis (19) of the external thread (22).

12. The main valve insert (20) as claimed in claim 1, wherein a height of the outer flank portion (24) is between 1.2 mm and 1.8 mm, wherein a height of the inner flank portion (25) is between 0.8 mm and 1.4 mm.

13. The main valve insert (20) as claimed in claim 12, wherein the height of the outer flank portion (24) is between 1.4 mm and 1.6 mm, wherein the height of the inner flank portion (25) is between 1 mm and 1.2 mm.

14. The main valve insert (20) as claimed in claim 1, wherein an external diameter of the external thread (22) is between 26 mm and 36 mm, or wherein the external diameter of the external thread (22) is between 37 mm and 47 mm, or wherein the external diameter of the external thread (22) is between 49 mm and 59 mm.

15. An arrangement comprising a main valve insert (20) as claimed in claim 1, and a thread receiver (30) for the main valve insert (20) which can be fixed inside a tap valve housing (52), wherein the thread receiver (30) has an internal thread (31) which is engaged with the external thread (22), wherein the internal thread (31) has thread recesses (33) into which the thread flanks (26) of the thread elevations (23) located in the outer flank portion (24) engage, forming a load-bearing threaded connection, wherein the internal thread has a guide projection (38) which is located between the thread recesses (33) and which extends over at least a part of the circumference of the internal thread and which bears in the axial direction against a thread flank (27) of oen of the thread elevations (23) located in the inner flank portion (24).

16. The arrangement as claimed in claim 15, wherein the guide projection (38) is positioned on a thread entry point of the internal thread (31).

17. The arrangement as claimed in claim 15, wherein the main valve insert (20) has in a screwing-in direction guide surfaces (43) which are positioned upstream of the external thread and which are designed such that they are guided slidably by the guide projection (38) when the main valve insert (20) is introduced into the thread receiver (30), wherein the guide projection extends over a circumferential portion of at least 90° of the internal thread (31).

18. The arrangement as claimed in claim 17, wherein the guide projection extends over a circumferential portion of at least 270° of the internal thread (31).

19. The arrangement as claimed in claim 15, wherein the external thread (22) has a bottom surface (28) which is located between the thread elevations (23), wherein the guide projection (38) bears against the bottom surface (28) in the radial direction.

20. A tap valve (10) for dispensing a fluid, comprising a tap valve housing (52), an inlet (50), an outlet (51), a main channel for the fluid connecting the inlet (50) to the outlet (51), a main valve body (14), a control lever (17) for actuating the tap valve (10) and an arrangement as claimed in claim 15.

* * * * *